United States Patent
Ikeda et al.

(10) Patent No.: US 9,391,343 B2
(45) Date of Patent: Jul. 12, 2016

(54) NONAQUEOUS ELECTROLYTE SECONDARY BATTERY

(71) Applicant: SANYO Electric Co., Ltd., Moriguchi-shi, Osaka (JP)

(72) Inventors: Daisuke Ikeda, Kakogawa (JP); Keisuke Minami, Kanzaki-gun (JP); Toyoki Fujihara, Kanzaki-gun (JP); Toshiyuki Nohma, Kakogawa (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 330 days.

(21) Appl. No.: 13/962,183

(22) Filed: Aug. 8, 2013

(65) Prior Publication Data
US 2014/0045044 A1 Feb. 13, 2014

(30) Foreign Application Priority Data
Aug. 9, 2012 (JP) ................................. 2012-176788

(51) Int. Cl.
| | |
|---|---|
| H01M 4/505 | (2010.01) |
| H01M 10/0563 | (2010.01) |
| H01M 2/02 | (2006.01) |
| H01M 10/052 | (2010.01) |
| H01M 4/13 | (2010.01) |
| H01M 4/131 | (2010.01) |
| H01M 4/525 | (2010.01) |
| H01M 10/0568 | (2010.01) |

(52) U.S. Cl.
CPC ........ *H01M 10/0563* (2013.01); *H01M 2/0237* (2013.01); *H01M 4/13* (2013.01); *H01M 4/131* (2013.01); *H01M 4/505* (2013.01); *H01M 4/525* (2013.01); *H01M 10/052* (2013.01); *H01M 10/0568* (2013.01); *Y02E 60/122* (2013.01); *Y02T 10/7011* (2013.01)

(58) Field of Classification Search
CPC .............................................. H01M 4/48–4/57
See application file for complete search history.

(56) References Cited

U.S. PATENT DOCUMENTS

| | | | | |
|---|---|---|---|---|
| 2010/0196764 A1* | 8/2010 | Ihara | ...................... | H01M 4/133 429/331 |
| 2010/0273054 A1* | 10/2010 | Cotton | .................. | H01M 4/131 429/221 |

FOREIGN PATENT DOCUMENTS

| | | |
|---|---|---|
| JP | 11-067270 A | 3/1999 |
| JP | 2008147068 A * | 6/2008 |

OTHER PUBLICATIONS

JP 2008-147068 English Translation.*

*Primary Examiner* — Scott J Chmielecki
(74) *Attorney, Agent, or Firm* — Westerman, Hattori, Daniels & Adrian, LLP (57) ABSTRACT

A nonaqueous electrolyte secondary battery according to an embodiment of the present invention includes an electrode assembly, a nonaqueous electrolyte, and a container. The electrode assembly has a positive electrode, a negative electrode, and a separator. The positive electrode contains particles of a lithium transition metal compound as a positive electrode active material. The negative electrode is opposed to the positive electrode. The separator is disposed between the positive electrode and the negative electrode. The nonaqueous electrolyte contains lithium difluorophosphate. The container houses the electrode assembly and the nonaqueous electrolyte. The battery capacity is not less than 21 Ah. The mean particle diameter ($D_{50}$) of the particles of the lithium transition metal compound is not less than 5 μm and not more than 15 μm. The ($D_{90}-D_{10}$)/$D_{50}$ of the particles of the lithium transition metal compound is under 1.1.

20 Claims, 5 Drawing Sheets

NONAQUEOUS ELECTROLYTE SECONDARY BATTERY

TECHNICAL FIELD

The present invention relates to a nonaqueous electrolyte secondary battery.

BACKGROUND ART

In recent years, there have been various endeavors to use nonaqueous electrolyte secondary batteries in, for example, electric vehicles, hybrid cars, and the like. In such applications, the batteries are required to have superior storage stability in addition to high output.

For example, JP-A-11-67270 discloses that the storage characteristics of a nonaqueous electrolyte secondary battery are improved by adding lithium difluorophosphate to its nonaqueous electrolyte.

SUMMARY

The inventors of the present invention have discovered, as a result of diligent researches, that although the storage characteristics of nonaqueous electrolyte secondary batteries can be improved by adding lithium difluorophosphate to their nonaqueous electrolyte, it will be further necessary to improve the low-temperature output characteristics in high-capacity nonaqueous electrolyte secondary batteries that are used for applications such as mentioned above.

A principal advantage of some aspects of the invention is to provide a nonaqueous electrolyte secondary battery whose low-temperature output characteristics are not prone to decline.

A nonaqueous electrolyte secondary battery according to an aspect of the invention includes an electrode assembly, a nonaqueous electrolyte, and a container. The electrode assembly includes a positive electrode, a negative electrode, and a separator. The positive electrode contains particles of a lithium transition metal compound as a positive electrode active material. The negative electrode is opposed to the positive electrode. The separator is disposed between the positive electrode and the negative electrode. The nonaqueous electrolyte contains lithium difluorophosphate. The container houses the electrode assembly and the nonaqueous electrolyte. The battery capacity is not less than 21 Ah. The mean diameter ($D_{50}$) of the particles of the lithium transition metal compound is not less than 5 μm and not more than 15 μm. The ($D_{90}$–$D_{10}$)/$D_{50}$ of particles of the lithium transition metal compound is under 1.1.

In the present invention, the mean diameter ($D_{50}$), the $D_{90}$, and the $D_{10}$ of the particles of the lithium transition metal compound each are values obtained by measurement using the laser diffraction scattering method. In the invention, the $D_{50}$ is the particle diameter when the cumulative volume frequency has reached 50%, the $D_{90}$ is the particle diameter when the cumulative volume frequency has reached 90%, and the $D_{10}$ is the particle diameter when the cumulative volume frequency has reached 10%.

The invention enables provision of a nonaqueous electrolyte secondary battery whose low-temperature output characteristics are not prone to decline.

BRIEF DESCRIPTION OF THE DRAWINGS

The invention will be described with reference to the accompanying drawings, wherein like numbers reference like elements.

DESCRIPTION OF EXEMPLARY EMBODIMENTS

A preferred embodiment that implements the invention will now be described with reference to the accompanying drawings. However, the following embodiment is merely an illustrative example and does not limit the invention in any way.

In the accompanying drawings, to which reference will be made in describing the embodiment and other matters, members that have substantially the same functions are assigned the same reference numerals throughout. In addition, the accompanying drawings, to which reference will be made in describing the embodiment and other matters, are schematic representations, and the proportions of the dimensions of the objects depicted in the drawings may differ from the proportions of the dimensions of the actual objects. The proportions of the dimensions of the objects may differ among the drawings. The concrete proportions of the dimensions of the objects should be determined in view of the following description.

Figure 1:
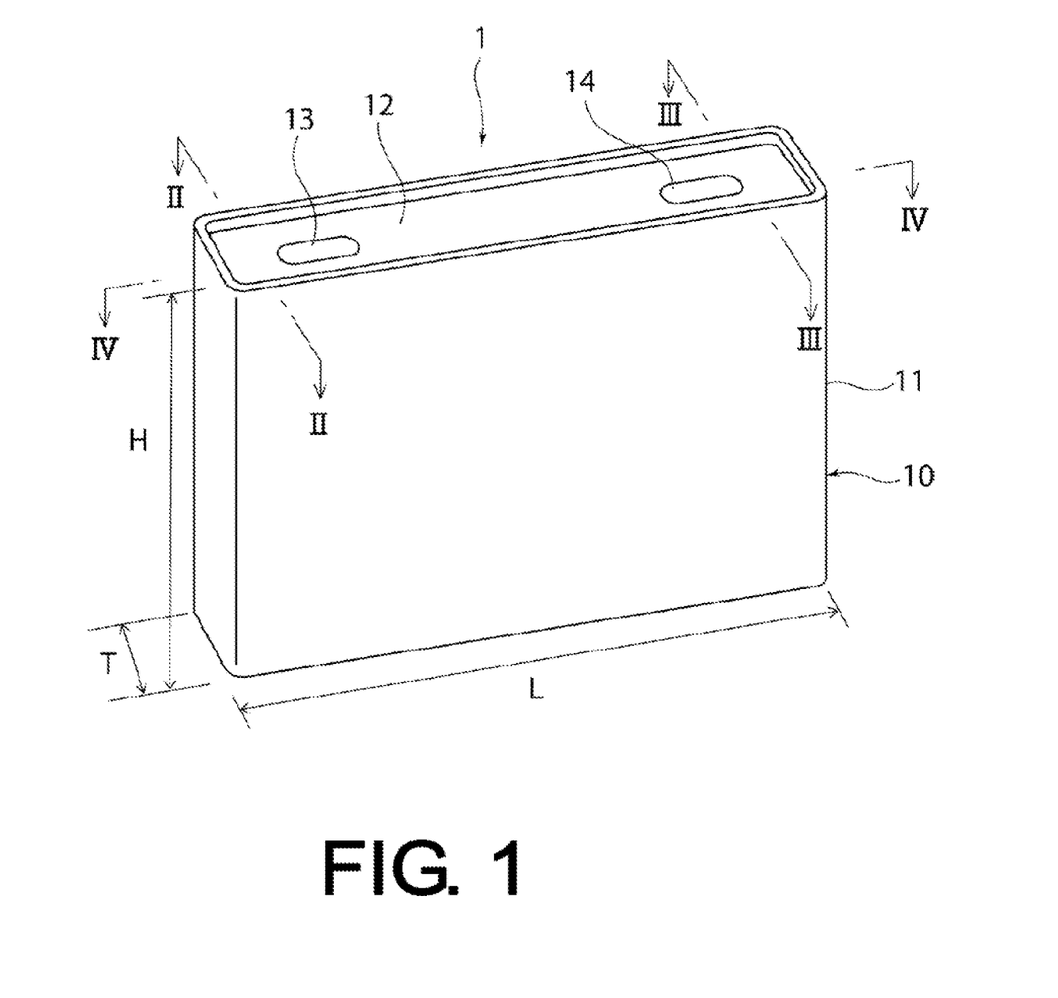
FIG. 1 is a simplified perspective view of a nonaqueous electrolyte secondary battery according to an embodiment of the invention.

A nonaqueous electrolyte secondary battery 1 shown in FIG. 1 is a prismatic nonaqueous electrolyte secondary battery. However, a nonaqueous electrolyte secondary battery of the invention could alternatively be cylindrical, flattened, or otherwise shaped. The nonaqueous electrolyte secondary battery 1 can be used for any kind of application, and will preferably be used in an electric vehicle and a hybrid vehicle, for example. The capacity of the nonaqueous electrolyte secondary battery 1 is not less than 21 Ah. Normally, the capacity of the nonaqueous electrolyte secondary battery 1 will be not more than 50 Ah.

The nonaqueous electrolyte secondary battery 1 includes a container 10 shown in FIGS. 1 to 4, and an electrode assembly 20 shown in FIGS. 2 to 5. The nonaqueous electrolyte secondary battery 1 is a prismatic nonaqueous electrolyte secondary battery in which the container 10 is approximately parallelepiped in shape.

The container 10 has a container body 11 and a sealing plate 12. The container body 11 is provided in the form of a rectangular tube of which one end is closed. In other words, the container body 11 is provided in the form of a bottomed square tube. The container body 11 has an opening. This opening is sealed up by the sealing plate 12. Thereby, the interior space approximately parallelepiped is formed into a compartment. The electrode assembly 20 and the nonaqueous electrolyte are housed in this interior space.

A positive electrode terminal 13 and a negative electrode terminal 14 are connected to the sealing plate 12. The positive electrode terminal 13 and the negative electrode terminal 14 are each electrically insulated from the sealing plate 12 by insulating material not shown in the drawings.

Figure 2:
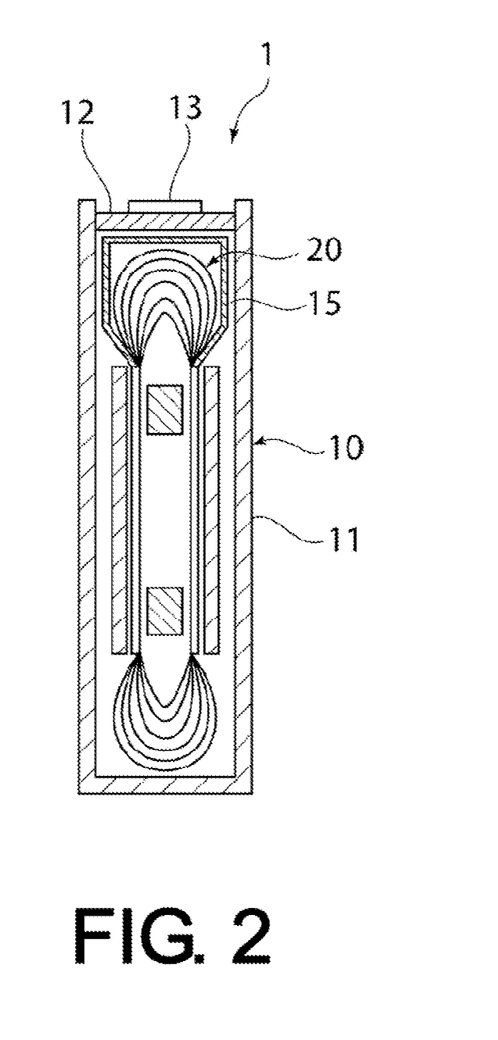
FIG. 2 is a simplified sectional view through line II-II in FIG. 1.
Figure 3:
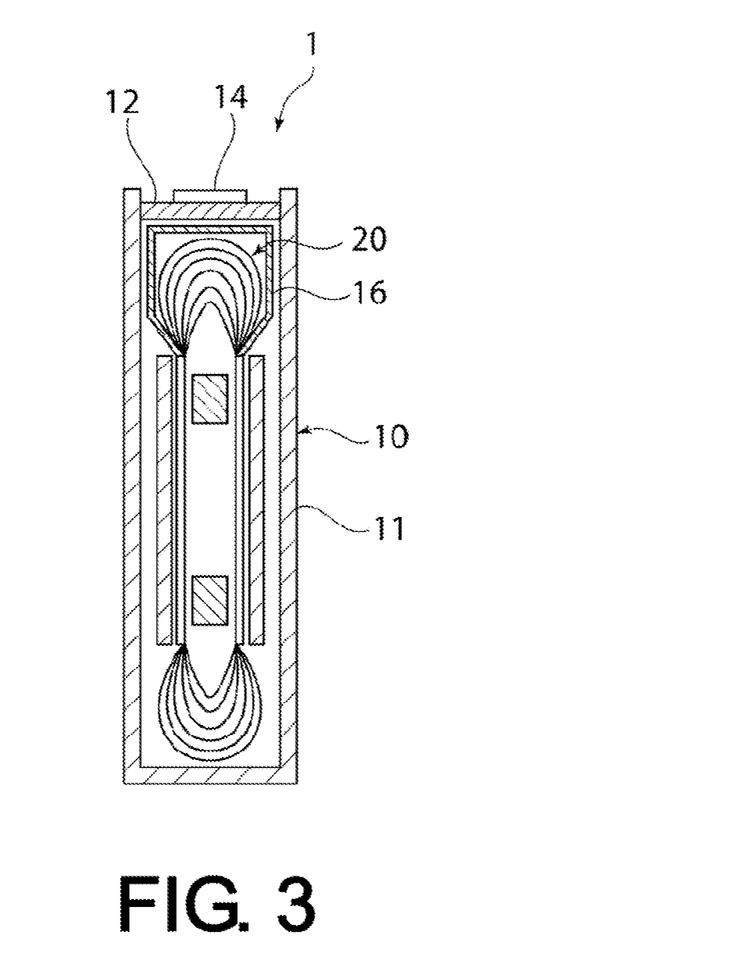
FIG. 3 is a simplified sectional view through line III-III in FIG. 1.
Figure 4:
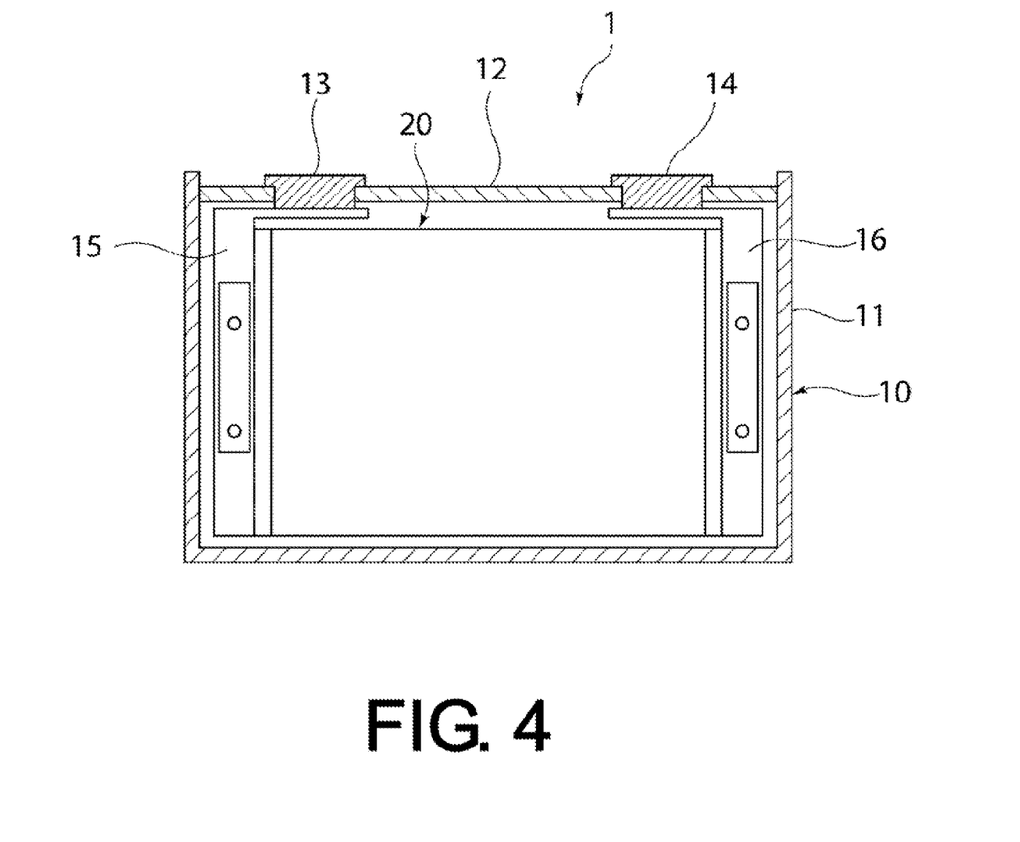
FIG. 4 is a simplified sectional view through line IV-IV in FIG. 1.

As shown in FIGS. 2 and 4, the positive electrode terminal 13 is electrically connected to a positive electrode substrate 21a of a positive electrode 21 by positive electrode collector 15. The positive electrode collector 15 can be formed of aluminum, an aluminum alloy, or other materials. As shown in FIGS. 2 and 3, the negative electrode terminal 14 is electrically connected to a negative electrode substrate 22a of a negative electrode 22 by negative electrode collector 16. The negative electrode collector 16 can be formed of copper, a copper alloy, or other materials.

The ratio of the height dimension H of the container 10 viewed from the front to its length dimension L (height dimension H/length dimension L) will more preferably be not less than 0.3 and not more than 1.0, and still more preferably not less than 0.4 and not more than 0.9.

The length dimension L of the container 10 will preferably be 100 to 200 mm. The height dimension H of the container 10 will preferably be 50 to 100 mm. The thickness dimension T of the container 10 will preferably be 10 to 30 mm.

Figure 5:
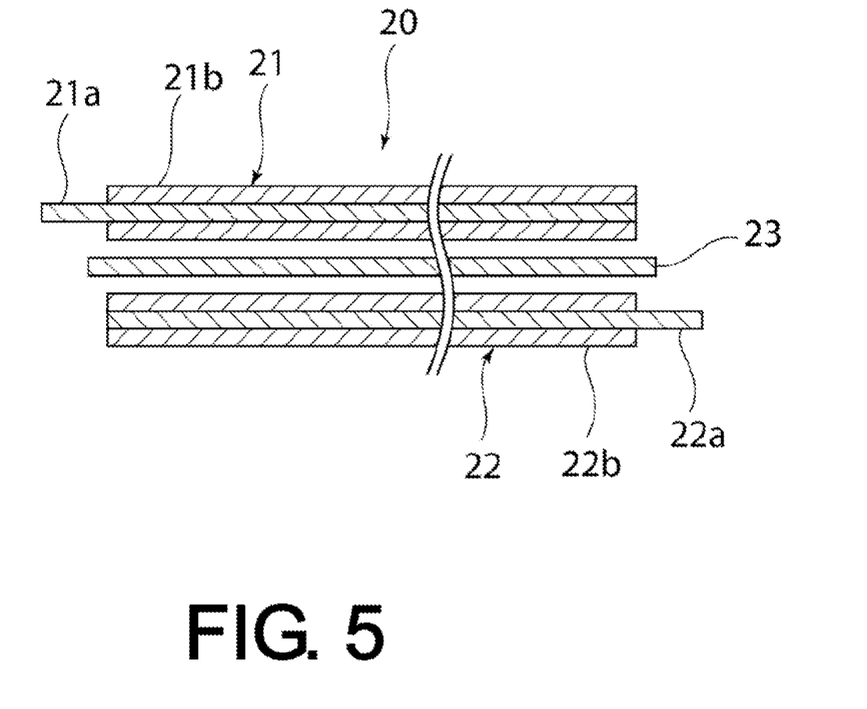
FIG. 5 is a simplified sectional view of part of the electrode assembly in an embodiment of the invention.

As shown in FIG. 5, the electrode assembly 20 includes the positive electrode 21, the negative electrode 22, and a separator 23. The positive electrode 21 and the negative electrode 22 are opposed to each other. The separator 23 is disposed between the positive electrode 21 and the negative electrode 22. The positive electrode 21, the negative electrode 22, and the separator 23 are wound and then pressed into a flattened shape. In other words, the electrode assembly 20 includes a flat wound positive electrode 21, negative electrode 22, and separator 23.

The positive electrode 21 includes the positive electrode substrate 21a and a positive electrode active material layer 21b. The positive electrode substrate 21a can be formed of aluminum, an aluminum alloy, or other materials. The positive electrode active material layer 21b is provided on at least one surface of the positive electrode substrate 21a. The positive electrode active material layer 21b contains particles of a lithium transition metal compound as positive electrode active material.

An example of the lithium transition metal compound that will preferably be used is a lithium oxide containing at least one kind of the transition metals of cobalt, nickel, and manganese. The following shows specific examples of such a lithium oxide containing at least one kind of the transition metals of cobalt, nickel, and manganese: lithium-containing nickel-cobalt-manganese complex oxides ($LiNi_xCo_yMn_zO_2$, $x+y+z=1$, $0 \leq x \leq 1$, $0 \leq y \leq 1$, $0 \leq z \leq 1$); lithium cobalt oxide ($LiCoO_2$); lithium manganese oxide ($LiMn_2O_4$); lithium nickel oxide ($LiNiO_2$); and a lithium-containing transition metal complex oxide such as a compound obtained by replacing part of the transition metal contained in these oxides with another element. Of these, lithium-containing nickel-cobalt-manganese complex oxides ($LiNi_xCo_yMn_zO_2$, $x+y+z=1$, $0 \leq x \leq 1$, $0 \leq y \leq 1$, $0 \leq z \leq 1$) and a lithium-containing transition metal complex oxide such as a compound obtained by replacing part of the transition metal contained in such oxide with another element will more preferably be used as the positive electrode active material. The positive electrode active material layer 21b may contain another component such as conductive material and binder as appropriate in addition to the positive electrode active material.

The negative electrode 22 includes the negative electrode substrate 22a and a negative electrode active material layer 22b. The negative electrode substrate 22a can be formed of copper, a copper alloy, or other materials. The negative electrode active material layer 22b is provided on at least one surface of the negative electrode substrate 22a. The negative electrode substrate 22a contains negative electrode active material. There is no particular limitation on the negative electrode active material, provided that it is able to reversibly absorb and desorb lithium. Examples of the negative electrode active material that will preferably be used are: carbon material, material that alloys with lithium, and metal oxide such as tin oxide. The following specific examples of carbon material can be cited: natural graphite, artificial graphite, mesophase pitch-based carbon fiber (MCF), mesocarbon microbeads (MCMB), coke, hard carbon, fullerene, and carbon nanotubes. Examples of material that can alloy with lithium are: one or more metals selected from the group consisting of silicon, germanium, tin, and aluminum, or an alloy containing one or more metals selected from the group consisting of silicon, germanium, tin, and aluminum. Of these, carbon material will preferably be used as the negative electrode active material, and natural graphite will more preferably be used as the negative electrode active material. The negative electrode active material layer 22b may contain another component such as conductive material and binder as appropriate in addition to the negative electrode active material.

The separator can be formed of a porous sheet of plastic such as polyethylene and polypropylene.

The electrode assembly 20 is housed inside the container 10. The nonaqueous electrolyte is also housed inside the container 10. The nonaqueous electrolyte contains lithium difluorophosphate ($LiPO_2F_2$) as solute. The addition of lithium difluorophosphate to the nonaqueous electrolyte enables enhancement of the storage characteristics of the nonaqueous electrolyte secondary battery 1.

In addition to lithium difluorophosphate, the nonaqueous electrolyte may contain as solute a substance such as: $LiXF_y$, (where X is P, As, Sb, B, Bi, Al, Ga, or In, and y is 6 when X is P, As, or Sb, and y is 4 when X is B, Bi, Al, Ga, or In); lithium perfluoroalkyl sulfonic acid imide $LiN(C_mF_{2m+1}SO_2)(C_nF_{2n+1}SO_2)$ (where m and n are independently integers from 1 to 4); lithium perfluoroalkyl sulfonic acid methide $LiC(C_pF_{2p+1}SO_2)(C_qF_{2q+1}SO_2)(C_rF_{2r+1}SO_2)$ (where p, q, and r are independently integers from 1 to 4); $LiCF_3SO_3$; $LiClO_4$; $Li_2B_{10}Cl_{10}$; and $Li_2B_{12}Cl_{12}$. Of these, the nonaqueous electrolyte may contain, as solute, at least one of $LiPF_6$, $LiBF_4$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, and lithium bis(oxalato)borate (LiBOB), for example. It will suffice for LiBOB to be present in the electrolyte immediately after the nonaqueous electrolyte secondary battery has been assembled. For example, after charge-discharge has been performed following assembly, the LiBOB may in some cases be present in the form of a LiBOB alteration. In other cases, at least a part of the LiBOB or the LiBOB alteration may be present on the negative electrode active material layer. Such cases are included in the technical scope of the invention.

The nonaqueous electrolyte may contain as solvent, for example, cyclic carbonate, chain carbonate, or a mixture of cyclic carbonate and chain carbonate. Specific examples of cyclic carbonate are ethylene carbonate, propylene carbonate, butylene carbonate, and vinylene carbonate. Specific examples of chain carbonate are dimethyl carbonate, methylethyl carbonate, and diethyl carbonate.

Nonaqueous electrolyte secondary batteries that are used in, for example, electric vehicles, hybrid vehicles, and the like are required to have not only high storage characteristics but also high output characteristics at low temperatures, since they are used in cold regions as well as other regions. Generally in the preparation of particles of the positive electrode active material, the packing density of particles of the positive electrode active material is enhanced, and the battery capacity is rendered large, by making $(D_{90}-D_{10})/D_{50}$ a high value.

However, as mentioned above, the inventors have discovered, as a result of diligent researches, that although the storage characteristics of nonaqueous electrolyte secondary batteries can be improved by adding lithium difluorophosphate to their nonaqueous electrolyte, their low-temperature output characteristics will in some cases decline.

As a result of further diligent researches, the inventors have discovered that by using particles of a lithium transition metal compound with a mean particle diameter ($D_{50}$) not less than 5 μm and not more than 15 μm, and with ($D_{90}-D_{10}$)/$D_{50}$ under 1.1, a nonaqueous electrolyte secondary battery 1 is obtained that has not only high storage characteristics but also high output characteristics at low temperatures. The detailed reasons for this are not necessarily clear, but it is probable that, thanks to the mean particle diameter ($D_{50}$) of the particles of the lithium transition metal compound being not less than 5 μm and not more than 15 μm, and their ($D_{90}-D_{10}$)/$D_{50}$ being under 1.1, the positive electrode active material contains no particles of a lithium transition metal compound with an excessively large particle diameter. Consequently, deterioration of the mobility of the lithium ions at low temperatures can be curbed, with the result that the low-temperature output characteristics are improved.

To further raise the low-temperature output characteristics of the nonaqueous electrolyte secondary battery 1, preferably the mean particle diameter (D50) of the particles of the lithium transition metal compound will be not less than 5 μm and not more than 12 μm, and furthermore their ($D_{90}-D_{10}$)/$D_{50}$ will be under 1.0.

To still further raise the low-temperature output characteristics of the nonaqueous electrolyte secondary battery 1, preferably the particles of the lithium transition metal compound has a ratio of the number of atoms of lithium to the number of atoms of the transition metal (the number of atoms of lithium/ the number of atoms of the transition metal) of not less than 1.02 and not more than 1.20, more preferably not less than 1.04 and not more than 1.18, at assembly of the nonaqueous electrolyte secondary battery 1.

To raise the storage characteristics while improving the low-temperature output characteristics of the nonaqueous electrolyte secondary battery 1, preferably the content of the lithium difluorophosphate in the nonaqueous electrolyte will be not less than 0.01 mol/L, and more preferably will be not less than 0.05 mol/L. The content of the lithium difluorophosphate in the nonaqueous electrolyte is usually not more than 0.1 mol/L. The preferable content range for the lithium difluorophosphate is based on the nonaqueous electrolyte in the nonaqueous electrolyte secondary battery immediately after assembly and before the first charging. The reason for providing such basis is that when a nonaqueous electrolyte secondary battery containing lithium difluorophosphate is charged, its content level gradually declines.

The invention will now be described in further detail on the basis of concrete examples. However, the invention is by no means limited to the following examples, and can be implemented in numerous appropriately varied forms without departing from the spirit and scope of the claims.

EXAMPLE 1

(1) Preparation of the Positive Electrode Active Material

An aqueous solution was prepared by mixing and dissolving particular amounts of nickel sulphate, cobalt sulphate, and manganese sulphate in water. Next, aqueous sodium hydroxide was added while stirring to obtain precipitates of nickel, cobalt, and manganese. The precipitates thus obtained were rinsed and filtered, then subjected to thermal treatment. After that, they were mixed with a particular amount of lithium carbonate, and then baked at 900° C. for 20 hours in an air atmosphere. The resultant substance was crushed and graded to fabricate the positive electrode active material. The composition formula of the positive electrode active material (lithium transition metal compound) thus obtained was $Li_{1.048}Ni_{0.333}Co_{0.333}Mn_{0.286}O_2$. The lithium transition metal compound was prepared in such a manner that the ratio of the number of atoms of lithium (Li) to the number of atoms of the transition metal (Me) was 1.1. The mean particle diameter ($D_{50}$) of the particles of the lithium transition metal compound was 8 μm. The ($D_{90}-D_{10}$)/$D_{50}$ of the particles of the lithium transition metal compound was 0.6. The particle diameters $D_{50}$, $D_{90}$, and $D_{10}$ of the positive electrode active material were measured using the aforementioned method.

(2) Fabrication of the Positive Electrode

The positive electrode active material obtained in the foregoing manner was mixed and kneaded with carbon black serving as conductive agent, and a solution of polyvinylidene fluoride serving as binding agent dispersed in N-methyl pyrrolidone (NMP) so that the solid content mass ratio of the positive electrode active material, carbon black, and polyfluoride vinylidene was 91:6:3, thereby preparing a positive electrode active material slurry.

This positive electrode active material slurry was applied to both surfaces of aluminum alloy foil (thickness 15 μm) serving as the positive electrode substrate, and then dried to remove the NMP used as solvent during the slurry preparation, thereby forming a positive electrode active material layer on the positive electrode substrate. However, no slurry was applied at one end along the longitudinal direction of the positive electrode substrate (same-direction end on both surfaces), and thus the substrate there was left exposed, thereby forming a positive electrode substrate exposed portion. The resultant substance was rolled and then cut into particular dimensions to fabricate the positive electrode.

(3) Fabrication of the Negative Electrode

Carbon material as the negative electrode active material, styrene butadiene rubber as a binding agent, and carboxymethyl cellulose as a thickening agent were mixed in a mass ratio of 98:1:1, then further mixed with water to produce a negative electrode active material slurry.

This negative electrode slurry was applied to both surfaces of copper foil (thickness 10 μm) serving as the negative electrode substrate, and then dried to remove the water used as solvent during the slurry preparation, thereby forming a negative electrode active material layer on the negative electrode substrate. However, no slurry was applied at one end along the longitudinal direction of the negative electrode substrate (same-direction end on both surfaces), and thus the substrate there was left exposed, thereby forming a negative electrode substrate exposed portion. The resultant substance was rolled and then cut into particular dimensions to fabricate the negative electrode.

(4) Fabrication of the Nonaqueous Electrolyte Secondary Battery

The foregoing positive electrode and negative electrode, and a separator formed of microporous polyethylene membrane were positioned so that a plurality of layers of the substrate exposed portion of the same polarity were overlapped with each other, the substrate exposed portions of the positive electrode and of the negative electrode protruded in opposite directions relative to the winding direction, and moreover the separator was interposed between the positive electrode active material layer and the negative electrode active material layer. Following that, the three members were stacked over each other and wound. An insulative winding fastening tape was then provided, after which the resultant item was pressed to form a flat wound electrode assembly.

Next, an aluminum positive electrode collector and a copper negative electrode collector were connected by laser welding to the positive electrode substrate gathering area where the layers of the positive electrode substrate exposed portion were stacked over each other and to the negative electrode substrate gathering area where the layers of the negative electrode substrate exposed portion were stacked over each other, respectively.

As regards preparation of the nonaqueous electrolyte, ethylene carbonate (EC) and ethylmethyl carbonate (EMC) were mixed in a volume ratio of 3:7 (at 25° C. and 1 atm) to form a nonaqueous solvent, into which $LiPF_6$ serving as electrolytic salt was dissolved so as to constitute 1 mol/L, thus producing a base nonaqueous electrolyte. This base nonaqueous electrolyte was then mixed with vinylene carbonate and cyclohexylbenzene in a mass ratio of 97.7:0.3:2.0, into which lithium bis(oxalato)borate and lithium difluorophosphate ($LiPO_2F_2$) were further dissolved to constitute 0.12 mol/L and 0.05 mol/L, respectively, thereby producing the nonaqueous electrolyte.

The foregoing electrode assembly designed to have a battery capacity of 22 Ah was inserted into a prismatic outer can, after which the positive and negative collector were connected to respective electrode external terminals provided on the sealing plate. The foregoing nonaqueous electrolyte was then poured in, and the mouth portion of the outer can was sealed, thereby completing the fabrication of the nonaqueous electrolyte secondary battery of Example 1.

Measurement of Output Characteristics at Low Temperature

The nonaqueous electrolyte secondary battery obtained in Example 1 was charged at normal temperature (25° C.) to SOC 50%. Next, discharge was performed at a low temperature (−30° C.) for 10 seconds with each of the currents of 20 A, 40 A, 60 A, 80 A, 100 A, 120 A, 140 A, and 160 A, the battery voltage in each case was measured, and the respective currents and battery voltages were plotted to derive the output characteristics. The output characteristics at low temperature were evaluated by means of indices relative to the characteristic of Comparative Example 1, which was taken as 100. The results of the evaluation of the output characteristics at low temperature are set forth in Table 1, where "A" represents a good low-temperature output characteristic of 110 and over, "B" represents a middling low-temperature output characteristic of 100 and over but not more than 105, and "C" represents a poor low-temperature output characteristic of 100 and under.

COMPARATIVE EXAMPLE 1

A nonaqueous electrolyte secondary battery was fabricated in the same manner as for Example 1 except that particles of a lithium transition metal compound with $(D_{90}-D_{10})/D_{50}$ of 1.6 were used as the positive electrode active material and that $LiPO_2F_2$ was not added to the nonaqueous electrolyte, and its low-temperature output characteristics were measured. The results of the low-temperature output characteristic evaluation are set forth in Table 1.

COMPARATIVE EXAMPLE 2

A nonaqueous electrolyte secondary battery was fabricated in the same manner as for Example 1 except that particles of a lithium transition metal compound with $(D_{90}-D_{10})/D_{50}$ of 1.6 were used as the positive electrode active material, and its low-temperature output characteristics were measured. The results of the low-temperature output characteristic evaluation are set forth in Table 1.

COMPARATIVE EXAMPLE 3

A nonaqueous electrolyte secondary battery was fabricated in the same manner as for Example 1 except that $LiPO_2F_2$ was not added to the nonaqueous electrolyte, and its low-temperature output characteristics were measured. The results of the low-temperature output characteristic evaluation are set forth in Table 1.

TABLE 1

| | Li/Me (the ratio of the numbers of atoms) | Mean particle diameter (μm) | $(D_{90}-D_{10})/$ (mean particle diameter $D_{50}$) | $LiPO_2F_2$ addition | Capacity (Ah) | Low-temperature output characteristic |
|---|---|---|---|---|---|---|
| Example 1 | 1.1 | 8 | 0.6 | Added | 22 | A |
| Comparative Example 1 | 1.1 | 8 | 1.6 | Not added | 22 | C |
| Comparative Example 2 | 1.1 | 8 | 1.6 | Added | 22 | B |
| Comparative Example 3 | 1.1 | 8 | 0.6 | Not added | 22 | B |

What is claimed is:

1. A nonaqueous electrolyte secondary battery, comprising:
    an electrode assembly including a positive electrode containing particles of a lithium transition metal compound as a positive electrode active material, a negative electrode opposed to the positive electrode, and a separator disposed between the positive electrode and the negative electrode;
    a nonaqueous electrolyte containing lithium difluorophosphate; and
    a container housing the electrode assembly and the nonaqueous electrolyte,
    the battery capacity being not less than 21 Ah, and
    the mean particle diameter ($D_{50}$) of the particles of the lithium transition metal compound being not less than 5 μm and not more than 15 μm, and $(D_{90}-D_{10})/D_{50}$ being under 1.1.

2. The nonaqueous electrolyte secondary battery according to claim 1, wherein
    the particles of the lithium transition metal compound have a ratio of the number of atoms of lithium to the number of atoms of the transition metal (the number of atoms of lithium/ the number of atoms of the transition metal) of not less than 1.02 and not more than 1.20 at assembly of the nonaqueous electrolyte secondary battery.

3. The nonaqueous electrolyte secondary battery according to claim 1, wherein
the content of the lithium difluorophosphate in the nonaqueous electrolyte is not less than 0.01 mol/L.

4. The nonaqueous electrolyte secondary battery according to claim 2, wherein
the content of the lithium difluorophosphate in the nonaqueous electrolyte is not less than 0.01 mol/L.

5. The nonaqueous electrolyte secondary battery according to claim 1, wherein
the $(D_{90}-D_{10})/D_{50}$ of the particles of the lithium transition metal compound is under 1.0.

6. The nonaqueous electrolyte secondary battery according to claim 2, wherein
the $(D_{90}-D_{10})/D_{50}$ of the particles of the lithium transition metal compound is under 1.0.

7. The nonaqueous electrolyte secondary battery according to claim 3, wherein
the $(D_{90}-D_{10})/D_{50}$ of the particles of the lithium transition metal compound is under 1.0.

8. The nonaqueous electrolyte secondary battery according to claim 4, wherein
the $(D_{90}-D_{10})/D_{50}$ of the particles of the lithium transition metal compound is under 1.0.

9. The nonaqueous electrolyte secondary battery according to claim 1, wherein the mean particle diameter ($D_{50}$) of the particles of the lithium transition metal compound is not less than 8 μm.

10. The nonaqueous electrolyte secondary battery according to claim 2, wherein the mean particle diameter ($D_{50}$) of the particles of the lithium transition metal compound is not less than 8 μm.

11. The nonaqueous electrolyte secondary battery according to claim 8, wherein the mean particle diameter ($D_{50}$) of the particles of the lithium transition metal compound is not less than 8 μm.

12. The nonaqueous electrolyte secondary battery according to claim 1, wherein the $(D_{90}-D_{10})/D_{50}$ of the particles of the lithium transition metal compound is not less than 0.6.

13. The nonaqueous electrolyte secondary battery according to claim 9, wherein the $(D_{90}-D_{10})/D_{50}$ of the particles of the lithium transition metal compound is not less than 0.6.

14. The nonaqueous electrolyte secondary battery according to claim 11, wherein the $(D_{90}-D_{10})/D_{50}$ of the particles of the lithium transition metal compound is not less than 0.6.

15. The nonaqueous electrolyte secondary battery according to claim 1, wherein the lithium transition metal compound contains Ni, Co, and Mn.

16. The nonaqueous electrolyte secondary battery according to claim 2, wherein the lithium transition metal compound contains Ni, Co, and Mn.

17. The nonaqueous electrolyte secondary battery according to claim 14, wherein the lithium transition metal compound contains Ni, Co, and Mn.

18. The nonaqueous electrolyte secondary battery according to claim 1, wherein the content of the lithium difluorophosphate in the nonaqueous electrolyte is not more than 0.1 mol/L.

19. The nonaqueous electrolyte secondary battery according to claim 4, wherein the content of the lithium difluorophosphate in the nonaqueous electrolyte is not more than 0.1 mol/L.

20. The nonaqueous electrolyte secondary battery according to claim 17, wherein the content of the lithium difluorophosphate in the nonaqueous electrolyte is not more than 0.1 mol/L.

* * * * *